US012004239B2

(12) United States Patent
Sivanesan et al.

(10) Patent No.: US 12,004,239 B2
(45) Date of Patent: *Jun. 4, 2024

(54) ENHANCED RACH (RANDOM ACCESS CHANNEL) DESIGN FOR 5G CIOT (CELLULAR INTERNET OF THINGS)

(71) Applicant: Apple Inc., Cupertino, CA (US)

(72) Inventors: Kathiravetpillai Sivanesan, Richardson, TX (US); Yaser M. Fouad, Hillsboro, OR (US); Vesh Raj Sharma Banjade, Hillsboro, OR (US); Joonbeom Kim, Carrollton, TX (US); Balkan Kecicioglu, Hillsboro, OR (US); Rath Vannithamby, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,809

(22) Filed: Jun. 27, 2022

(65) Prior Publication Data
US 2022/0330332 A1    Oct. 13, 2022

Related U.S. Application Data

(63) Continuation of application No. 16/883,033, filed on May 26, 2020, now Pat. No. 11,388,760, which is a (Continued)

(51) Int. Cl.
H04W 74/08 (2009.01)
H04W 72/23 (2023.01)
(Continued)

(52) U.S. Cl.
CPC ......... H04W 74/085 (2013.01); H04W 72/23 (2023.01); H04W 72/542 (2023.01); H04W 74/0841 (2013.01); H04W 4/70 (2018.02)

(58) Field of Classification Search
CPC ...... H04W 74/08; H04W 72/08; H04W 72/14
See application file for complete search history.

(56) References Cited

U.S. PATENT DOCUMENTS 6,542,493 B1    4/2003 Moerder
8,681,765 B2    3/2014 Kwon
(Continued)

FOREIGN PATENT DOCUMENTS

CN    101137239 A    3/2008
CN    101990236 A    3/2011
(Continued)

OTHER PUBLICATIONS

International Search Report dated Mar. 30, 2016 for International Application PCT/US2015/068340.
(Continued)

Primary Examiner — Zhiren Qin
(74) Attorney, Agent, or Firm — Eschweiler & Potashnik

(57) ABSTRACT

Techniques for random access (RA) in a cellular internet-of-things (CIOT) are discussed. An example apparatus configured to be employed within a User Equipment (UE), comprises a receiver circuitry, a processor, and transmitter circuitry. The receiver circuitry is configured to receive RA resource allocation information via one of a system information message or a downlink control information (DCI) message. The processor is operably coupled to the receiver circuitry and configured to: select a RA preamble sequence; generate a payload; and spread the payload via a spreading sequence. The transmitter circuitry is configured to transmit, based on the RA resource allocation information, a RA message comprising the RA preamble sequence and the payload, wherein the RA message is transmitted in a RA slot. The receiver circuitry is further configured to receive a
(Continued)

response comprising a device identity of the UE and one of an uplink (UL) grant or a RA reject message.

20 Claims, 7 Drawing Sheets

Related U.S. Application Data continuation of application No. 15/747,221, filed as application No. PCT/US2015/066340 on Dec. 17, 2015, now Pat. No. 10,667,301.

(60) Provisional application No. 62/197,471, filed on Jul. 27, 2015.

(51) Int. Cl.
*H04W 72/542* (2023.01)
*H04W 74/0833* (2024.01)
*H04W 4/70* (2018.01)

(56) References Cited

U.S. PATENT DOCUMENTS

| | | | |
|---|---|---|---|
| 2004/0014452 A1 | 1/2004 | Lim | |
| 2007/0210916 A1 | 9/2007 | Ogushi | |
| 2009/0041240 A1 | 2/2009 | Parkvall | |
| 2010/0027592 A1 | 2/2010 | Arviv | |
| 2010/0093386 A1 | 4/2010 | Damnjanovic et al. | |
| 2010/0195607 A1* | 8/2010 | Lee | H04W 74/0866 370/329 |
| 2011/0019633 A1 | 1/2011 | Tajima | |
| 2011/0194432 A1 | 8/2011 | Kato | |
| 2012/0155310 A1 | 6/2012 | Kreuzer et al. | |
| 2012/0163235 A1* | 6/2012 | Ho | H04W 52/383 370/254 |
| 2012/0307777 A1 | 12/2012 | Pan et al. | |
| 2013/0021997 A1 | 1/2013 | Lee | |
| 2013/0083753 A1 | 4/2013 | Lee et al. | |
| 2013/0215848 A1 | 8/2013 | Kato | |
| 2013/0329711 A1* | 12/2013 | Seo | H04J 11/0069 370/336 |
| 2014/0160926 A1 | 6/2014 | Gage | |
| 2014/0169300 A1 | 6/2014 | Kim et al. | |
| 2014/0241318 A1 | 8/2014 | Zhong | |
| 2014/0328325 A1* | 11/2014 | Bai | H04W 74/0833 370/331 |
| 2016/0066255 A1* | 3/2016 | Marinier | H04W 56/001 370/350 |
| 2016/0212737 A1 | 7/2016 | Jang | |
| 2016/0255591 A1 | 9/2016 | Park et al. | |
| 2016/0255654 A1* | 9/2016 | Lin | H04L 5/0048 370/329 |
| 2016/0262138 A1 | 9/2016 | Sundberg | |
| 2016/0295624 A1 | 10/2016 | Novlan | |
| 2016/0309518 A1* | 10/2016 | Patel | H04W 74/0891 |
| 2016/0338112 A1 | 11/2016 | Lee | |
| 2017/0006598 A1* | 1/2017 | Uemura | H04W 16/32 |
| 2017/0223744 A1 | 8/2017 | Qian | |
| 2018/0139760 A1 | 5/2018 | Lee | |

FOREIGN PATENT DOCUMENTS

| | | |
|---|---|---|
| CN | 101999219 A | 3/2011 |
| CN | 102387600 A | 3/2012 |
| CN | 102440057 A | 5/2012 |
| CN | 102498746 A | 6/2012 |
| CN | 103929826 A | 7/2014 |
| CN | 103974445 A | 8/2014 |
| CN | 103999528 A | 8/2014 |
| CN | 103179670 A | 6/2016 |
| EP | 2536048 A2 | 12/2012 |
| KR | 20100089262 A | 8/2010 |
| KR | 101407604 B1 | 6/2014 |
| KR | 20140071480 A | 6/2014 |
| KR | 20150043963 A | 4/2015 |
| WO | 2011/097767 A1 | 8/2011 |
| WO | 2011099829 A2 | 8/2011 |

OTHER PUBLICATIONS

New Study Item on Cellular System Support for Ultra Low Complexity and Low Throughput Internet of Things Document for: Approval. Agenda Item: 11.1 Source: VODAFONE Group Plc. 3GPP TSG-GERAN Meeting #62 Valencia, Spain, May 26-30, 2014. GP-140411. 6 pages.
"3rd Generation Partnership Project; Technical Specification Group GSM/EDGE Radio Access Network; Cellular System Support for Ultra Low Complexity and Low Throughput Internet of Things; (Release 13)" 3GPP TR 45.820 V1.2.1 (May 2015). GSM Global System for Mobile Communications. 162 pages.
"Pseudo CR 45.820—EC-GSM—Concept description." 3GPP TSG Geran Ad Hoc #1 on Cellular IoT, Sofia Antipolis, Feb. 2-5, 2015, Source: Ericsson LM. GPC150088. Agenda Item 1.4.3.1, 2.7.
3GPP TR 45.820 V1.4.0 (Jul. 2015) Release 13. pp. 1-84.
3GPP TR 45.820 V1.4.0 (Jul. 2015) Release 13. pp. 85-168.
3GPP TR 45.820 V1.4.0 (Jul. 2015) Release 13. pp. 169-252.
3GPP TR 45.820 V1.4.0 (Jul. 2015) Release 13. pp. 253-336.
3GPP TR 45.820 V1.4.0 (Jul. 2015) Release 13. pp. 337-363.
International Preliminary Report on Patentability dated Jan. 30, 2018 for International Application PCT/US2015/066340.
Non-Final Office Action dated Jul. 30, 2019 in connection with U.S. Appl. No. 15/747,221.
Notice of Allowance dated Jan. 21, 2020 in connection with U.S. Appl. No. 15/747,221.
"PCR 45.820 NB-CIoT—Grant-Free Multiple Access for Uplink Transmission (Update of GPC150514)." Source: Samsung Electronics. Agenda item: 1.4.2.5, 2.4.1.5. 3GPP TSG GERAN CIoT Ad-hoc#3, GPC150523, Kista, Sweden, Jun. 29-Jul. 2, 2015.
NTT DOCOMO; PRACH repetition in Rel-13 low complexity UE; 3GPP TSG RAN WG1 Meeting #81; R1-153326; May 25, 2015.
Non-Final Office Action dated Nov. 19, 2021 in connection with U.S. Appl. No. 16/883,033.
Notice of Allowance dated Mar. 16, 2022 in connection with U.S. Appl. No. 16/883,033.
Chinese Office Action, Mailed Date: Nov. 23, 2023, in connection with Chinese Patent Application No. 202110902100.3.
GPC150523 pCR 45.820 NB-CIoT—Grant-Free Multiple Access for Uplink Transmission (revision of GPC150514); 3GPP tsg_geranTSG_GERAN; Jun. 29, 2015.
GPC150088, pCR GSM Evolution—concept description (revision of GPC150063); 3GPP tsg_geranTSG_GERAN; Jan. 29, 2015.
TR 45 820v140_clean; 3GPP specs45_series; Jul. 14, 2015.

* cited by examiner

ENHANCED RACH (RANDOM ACCESS CHANNEL) DESIGN FOR 5G CIOT (CELLULAR INTERNET OF THINGS)

REFERENCE TO RELATED APPLICATIONS

This application is a continuation of U.S. application Ser. No. 16/883,033 filed May 26, 2020, which is a continuation of U.S. application Ser. No. 15/747,221 filed on Jan. 24, 2018 (now U.S. Pat. No. 10,667,301, issued May 26, 2020), which is a National Phase entry application of International Patent Application No. PCT/US2015/066340 filed on Dec. 17, 2015, which claims priority to U.S. Provisional Application 62/197,471 filed on Jul. 27, 2015, entitled "ENHANCED RACH DESIGN FOR CLEAN STATE CIOT SYSTEMS", and are hereby incorporated by reference in their entirety.

FIELD

The present disclosure relates to wireless technology and more specifically to a random access channel (RACH) design for 5G (Fifth generation) clean slate cellular internet of things (5G-CIoT).

BACKGROUND

The random access (RA) process in wireless systems is normally used to extract timing and frequency (phase) information of the uplink (UL) transmission for UL timing synchronization and initial frequency correction, and to initiate the network entry process for the mobile device (e.g., UE (user equipment)). In the GERAN (GSM (Global System for Mobile communications) EDGE (Enhanced Data Rates for GSM Evolution) Radio Access Network) clean slate cellular internet-of-things (CS-CIoT) study item, 3GPP (Third Generation Partnership Project) TR (technical report) 45.820, radio access network features are being developed targeting features such as low cost, massive numbers of devices, remarkably long device battery life and delay tolerant small-size packets. An additional important target feature of such networks is 20 dB coverage extension for devices deployed deep inside buildings or underground. For UL, the CS-CIoT devices first establish a connection with the base station. Important to initiating this connection is to go through the RA process. The conventional RA process for CS-CIoT specified in 3GPP TR 45.820 is based on the slotted ALOHA type of access. For such an access mechanism, the RA channel (RACH) resources are uniformly distributed in a super frame in the time domain and in different UL channels in the frequency domain.

The devices obtain the location of RA resources by reading the system information messages for contention based RA or downlink control information (DCI) for the non-contention based RA. The devices are then grouped into different coverage classes based on their link quality. The different RA resources are thus allocated across different coverage classes. The system information (SI-2) carries the MCS (modulation and coding scheme) level, UL PCId (physical channel identity, and RACH index.

DETAILED DESCRIPTION

Figure 1:
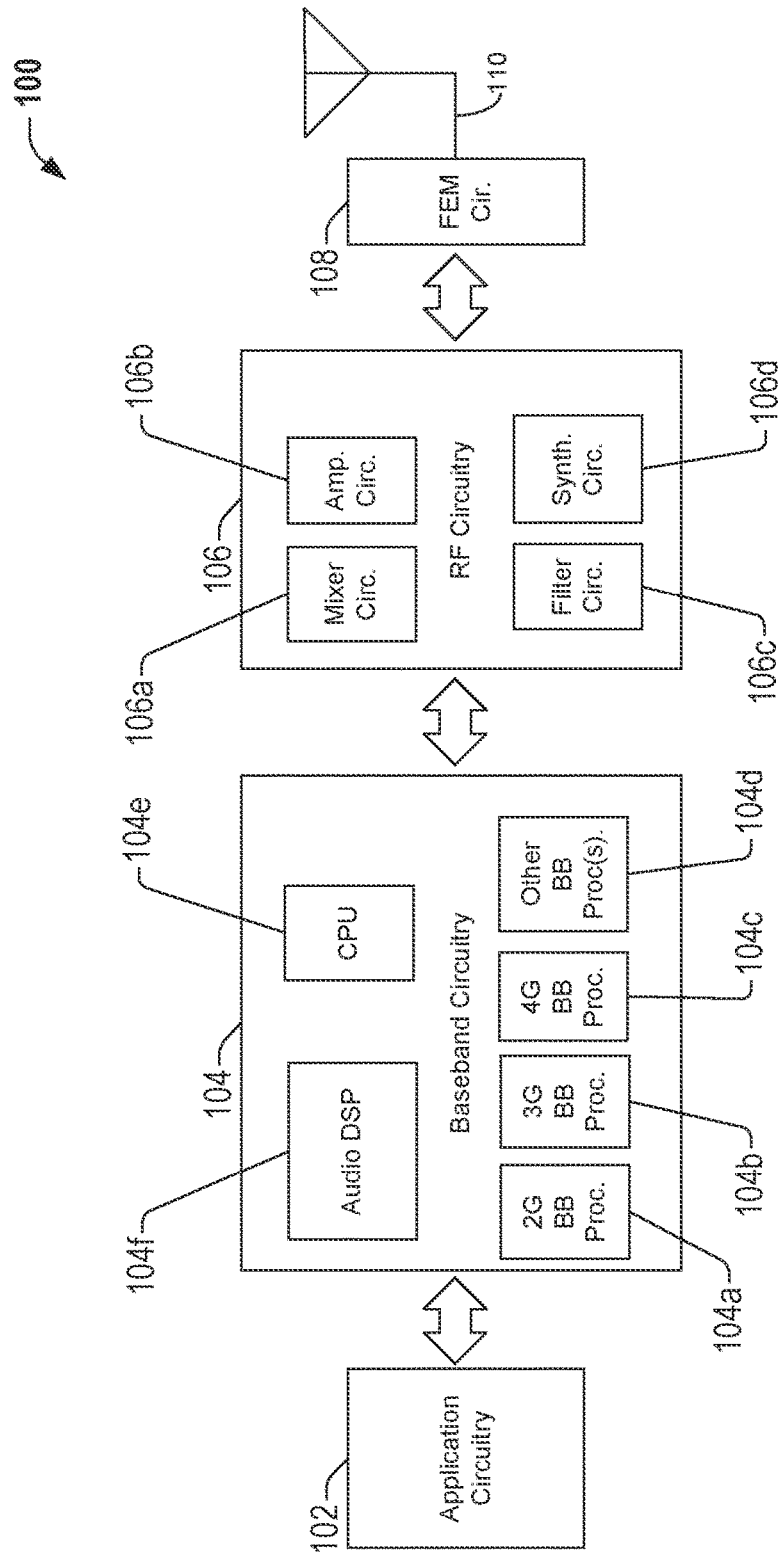
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature down conversion and/or up conversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct down conversion and/or direct up conversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Conventional RACH design for CS-CIoT has multiple drawbacks.

First, the RA is based on the slotted ALOHA technique. However, when a massive (e.g., on the order of millions, etc.) of CIoT UEs are deployed, the likelihood for multiple UEs in the same coverage class trying to access the network at the same time is substantial, thus resulting in RA collision and failure.

Second, for meeting the low-cost target of CS-CIoT UEs, the RACH process specified in 3GPP TR 45.820, which inherently comprises numerous sub-procedures, could lead to a longer execution time for the RACH process, thus consuming more UE power. Hence, reducing the execution of the RACH process is pivotal to improve the UE battery life.

In various embodiments disclosed herein, a preamble-based RA mechanism can be employed. A base station such as an Evolved Universal Terrestrial Radio Access Network (E-UTRAN) Node B (Evolved Node B, eNodeB, or eNB) can periodically allocate RA resources for different coverage classes. Multiple UEs in the same coverage class can access the network with randomly selected sequences from a set of known sequences for a contention based RA, or the base station can assign sequences to UEs for non-contention based RA. RA requests by UEs can be made via a RA message comprising a RA preamble sequence and a payload (e.g., containing a UE ID (identity), RA cause, and a buffer status report) that can follow the RA preamble sequence transmission. The payload can be spread using another random spreading sequence, which can be selected from a different set of sequences. A UE-specific random time offset selected from a set of predefined time offsets can be imposed on the transmission of the RA message to increase the probability of identifying RA preamble collision when two UEs select the same preamble sequence. The Time offsets can be selected in such a way that peaks corresponding to the different sequences can be visible during the auto correlation process.

Various aspects discussed herein can provide multiple advantages over conventional RACH design in CS-CIoT. First, the preamble sequence based RA process discussed herein can reduce RA collision in contention based RA. Second, predefined random delays between RA transmissions of UEs in the RA resources can be employed to identify the UEs even if they select the same preamble sequence. Third, the RA payload can be spread using different random spreading sequences to differentiate the UEs during the preamble collision.

In the conventional RACH design for CS-CIoT, the base station allocates the resources for RA periodically in a super frame. Because there is no RACH logical channel defined, the RA transmission is performed in the traffic channel with the resource mapping of the traffic channel. The UE can transmit a random number in the allocated RA resources. If the RA messages with random numbers from two UEs collide, there is no provision in the conventional design to differentiate such UEs. If the random number is successfully received, the base station can allocate dedicated resources for the payload transmission from the UE. Moreover, the conventional CS-CIoT RA procedure follows the relatively long RA process similar to the legacy LTE (long term evolution) RA procedure, with several steps.

In various aspects discussed herein, RA messages can be transmitted in RA slots that comprise a RA preamble sequence and a payload. The preamble sequence can facilitate timing and frequency estimation. The payload can be transmitted with the preamble to shorten the RA procedure. Predefined time delays can be introduced for each UE to identify preamble collision.

Compared to conventional CS-CIoT RACH design, embodiments discussed herein provide a reduction in the RA collision and failure rates, and improve the RA channel capacity. Additionally, the shortened RA procedure reduces power consumption at UEs, allowing for longer battery life.

Figure 2:
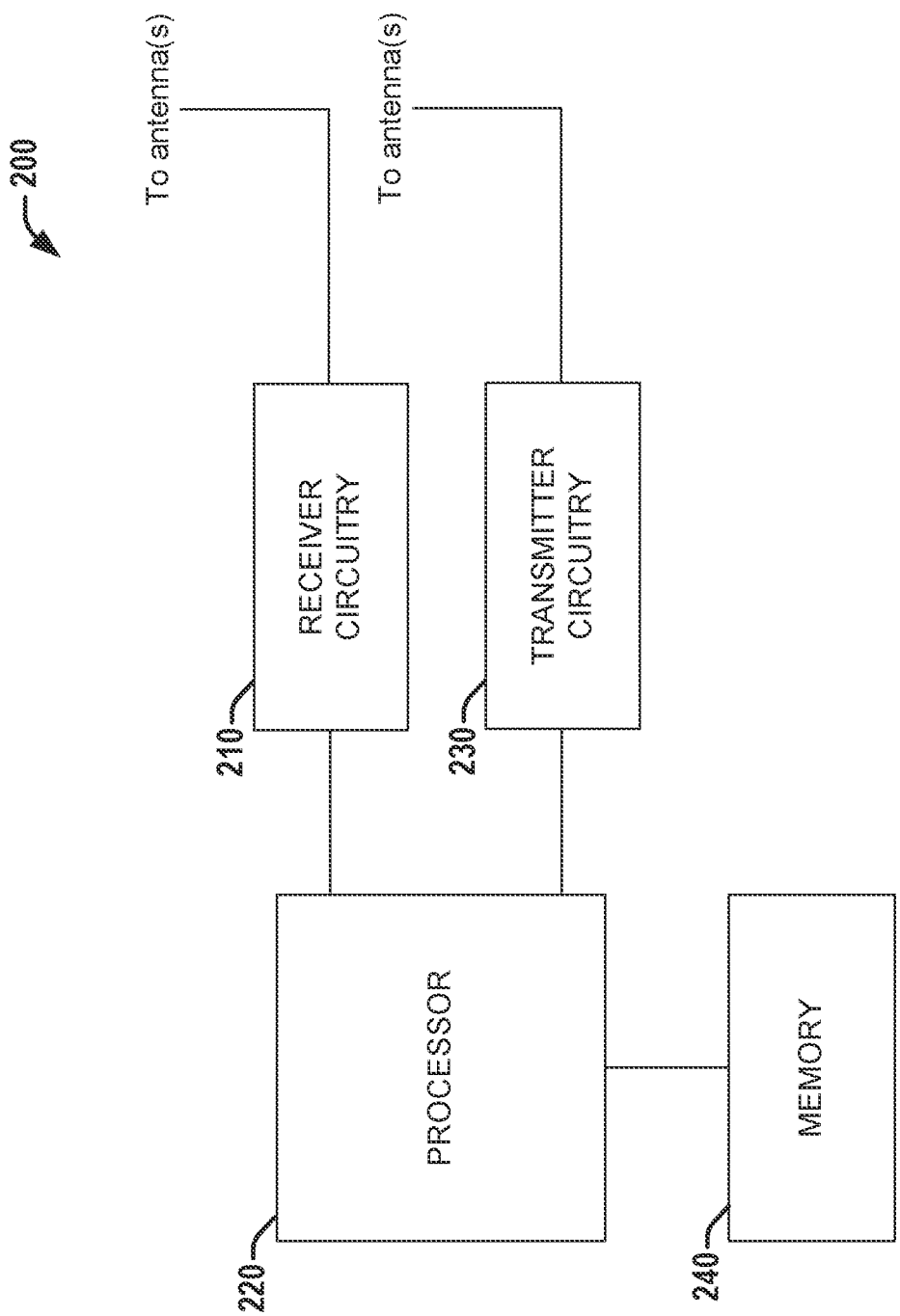
FIG. 2 is a block diagram of a system employable in a UE that facilitates communication of RA (random access) messaging via a RACH (RA channel) in a CS (clean slate)-CIoT (cellular internet-of-things) wireless system according to various aspects described herein.

Referring to FIG. 2, illustrated is a block diagram of a system 200 that facilitates communication of LAA burst control information associated with a LAA burst to a mobile terminal according to various aspects described herein. System 200 can include receiver circuitry 210, a processor 220, transmitter circuitry 230, and memory 240 (which can comprise any of a variety of storage mediums and can store instructions and/or data associated with one or more of receiver circuitry 210, processor 220, or transmitter circuitry 230). In various aspects, system 200 can be included within a user equipment (UE). As described in greater detail below, system 200 can facilitate transmission of RA messages to an eNB in a CS-CIoT wireless system with reduced power consumption and collision probability than the conventional CS-CIoT RACH design.

Receiver circuitry 210 can receive a set of RA resource allocation information from one of two sources, depending on whether contention based RA or non-contention based RA is being employed. For contention based RA, receiver circuitry 210 can receive the RA resource allocation information from system information (SI) messages transmitted by an eNB. For non-contention based RA, receiver circuitry 210 can receive the RA resource allocation information and an index of a preamble sequence from downlink control information (DCI) messaging received from the eNB. The receiver circuitry 210 can also monitor radio link conditions associated with the communications channel.

Based on the monitored radio link conditions, processor 220 can determine a coverage class for the UE. Processor 220 can also construct an RA message, which can include a RA preamble and a payload.

Processor 220 can select the RA preamble sequence one of two ways, depending on whether the RA message is to be sent via contention based RA or non-contention based RA. For contention based RA, the processor 220 can select the RA preamble randomly from a set of RA preamble sequences for a contention based RA mode. For non-contention based RA, the RA resource allocation information received via a DCI message from the eNB can indicate an RA preamble via an associated index, and processor 220 can select the RA preamble associated with the index from a set of RA preamble sequences for non-contention based RA. In some aspects, different sets of sequences are associated with different coverage classes, and processor 220 can select the RA preamble (e.g., using the appropriate technique depending on whether contention based or non-contention based RA is to be employed, etc.) from a set of sequences associated with the coverage class. In some such aspects, longer preamble sequences can be employed (e.g., in coverage classes associated with worse radio link conditions, etc.) to facilitate decoding of the RA message. In some embodiments, the RA preamble can be padded with one or more dummy bits (e.g., at the front, at the end, or both), which can mitigate inter-symbol interference.

For either contention based or non-contention based RA, processor 220 can generate a preamble that can include one or more of a UE identity, a buffer status report (e.g., an indication of an amount of data to transmit, etc.), a cause for the RA request, a number of repetitions (e.g., which, when included, can be selected based at least in part on the coverage class, etc.), or other information. Processor 220 can spread the generated payload via a spreading sequence, which processor 220 can select from a set of pseudo random sequences (e.g., randomly or based on the RA resource allocation information, which can depend on the RA mode being contention based or non-contention based). In various aspects, the set of pseudo random sequences from which the spreading sequence is selected can be a distinct set of pseudo random sequences than the set from which the RA preamble is selected, in either the contention based RA mode or the non-contention based RA mode. In some aspects, different sets of sequences are associated with different coverage classes, and processor 220 can select the spreading sequence from a set of sequences associated with the coverage class. In some such aspects, longer spreading sequences can be employed (e.g., in coverage classes associated with worse radio link conditions, etc.) to facilitate decoding of the RA message.

Transmitter circuitry 230 can transmit the RA message in a RA slot in a random access channel (RACH) (e.g., in a RA slot associated with the coverage class determined by processor 220, etc.). The RA message can comprise the selected RA preamble and the payload (e.g., spread via the selected spreading sequence). In various aspects, transmitter circuitry 230 can transmit the RA message with guard periods in one or more of the following locations: preceding the RA preamble, between the RA preamble and payload, or following the payload. For multiple repetitions, transmitter circuitry 230 can transmit the RA message a number of times (in different RA slots) equal to the number of repetitions indicated via the payload.

In various aspects, transmitter circuitry 230 can transmit the RA message with a delay, which can be selected from a predefined set of delay values. In some such aspects, the delay can be a UE-specific value. The set of delay values can be defined such that peaks corresponding to different sequences can be identified via auto-correlation, which can help identify preamble collision.

Receiver circuitry 210 can also receive a response to the RA message from the eNB it was sent to. Assuming the RA message is successfully received by the eNB, the eNB can either allocate resources or reject the RA request. In the former case, the response to the RA message can comprise the UE identity of the UE and an uplink (UL) grant. In the latter case, the response to the RA message can comprise the UE identity and a RA reject message.

Figure 3:
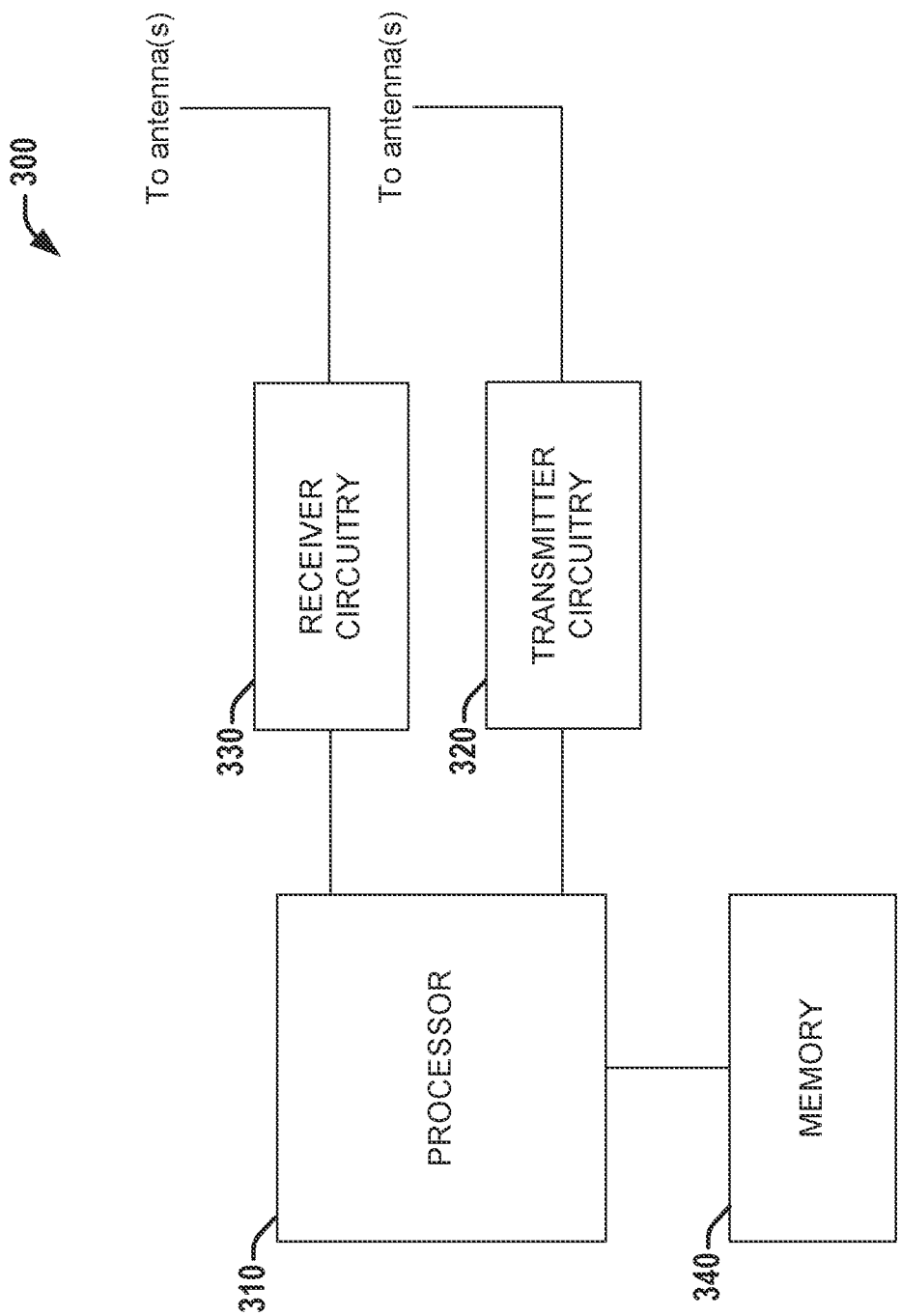
FIG. 3 is a block diagram of a system employable in an enhanced node B (eNB) or other base station that facilitates communication via a RACH with one or more UEs in a CS-CIoT wireless system according to various aspects described herein.

Referring to FIG. 3, illustrated is a block diagram of a system 300 that facilitates communication via a random access channel (RACH) for cellular internet-of-things (CIoT) user equipment (UEs) according to various aspects described herein. System 300 can include a processor 310, transmitter circuitry 320, receiver circuitry 330, and a memory 340 (which can comprise any of a variety of storage mediums and can store instructions and/or data associated with one or more of processor 310, transmitter circuitry 320, or receiver circuitry 330). In various aspects, system 300 can be included within an Evolved Universal Terrestrial Radio Access Network (E-UTRAN) Node B (Evolved Node B, eNodeB, or eNB) or other base station in a wireless communications network. As described in greater detail below, system 300 can facilitate communication from CS-CIoT UEs of RA messages with reduced power consumption and collision likelihood when compared to conventional systems.

Processor 310 can select a RA mode from between a contention based RA mode and a non-contention based RA mode. Processor 310 can allocate one or more sets of resources as RA slots for RA requests in a RA channel (RACH). In various aspects, different resources can be allocated for different coverage classes. In some such aspects, different amounts of resources can be allocated for different coverage classes, for example, allocating greater amounts of resources for coverage classes associated with poorer link conditions.

Transmitter circuitry 320 can transmit RA parameters and the resources allocated for RA messaging. The RA parameters can indicate the RA mode (e.g., contention based or non-contention based), and for non-contention based RA, indicate a designated preamble for each of one or more UEs. Transmitter circuitry 320 can transmit RA parameters associated with contention based RA via system information messaging, and can transmit RA parameters associated with non-contention based RA via DCI messaging to a UE that also indicates a RA preamble for that UE via an associated index.

Receiver circuitry 330 can receive one or more RA requests via the assigned UL resources in the form of RA messages sent by UEs. In various embodiments, each RA message can comprise a RA preamble and a payload (e.g., that can indicate information associated with the requesting ID, which can include one or more of a UE ID, buffer status report, RA cause, number of repetitions of the RA message that will be sent, etc.). The payload can be spread via a spreading sequence as discussed herein, and in some aspects, the length of the RA preamble and spreading sequence can vary based on the coverage class. Also, as discussed herein, guard periods and/or dummy bits can be included within the RA message, and the timing of transmission of RA messages can be offset by a delay, which can be UE dependent.

For each received RA message, processor 310 can attempt to decode the RA message. For RA messages sent with multiple repetitions, soft combining of the multiple versions can be employed. If the RA message is successfully decoded, processor 310 can generate one of a UL grant message or a RA reject message, which can be based on a decision by a scheduler in the eNB, etc. For each decoded RA message, transmitter circuitry 320 can transmit, in response to that RA message, the UE ID of the UE that sent the RA message followed by the UL grant or RA reject message.

Figure 4:
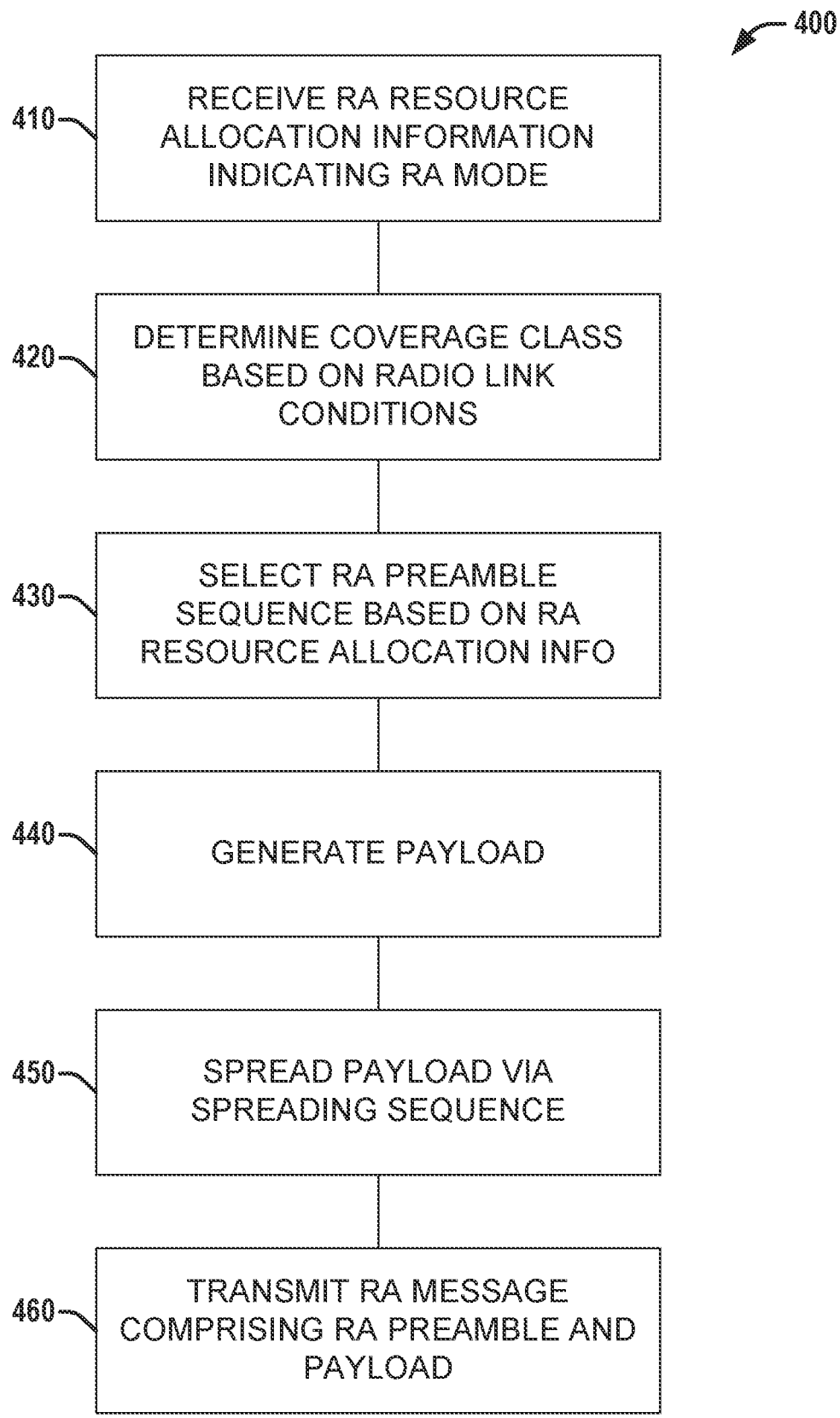
FIG. 4 is a flow diagram illustrating a method of facilitating communication of RA messaging via a RACH in a CS-CIoT wireless system according to various aspects described herein.

Referring to FIG. 4, illustrated is a flow diagram of a method 400 of facilitating communication of RA messaging via a RACH in a CS-CIoT wireless system according to various aspects described herein. In some aspects, method 400 can be performed at a UE. In other aspects, a machine readable medium can store instructions associated with method 400 that, when executed, can cause a UE to perform the acts of method 400.

At 410, a set of RA resource allocation information can be received (e.g., via system information or a DCI message), which can include an indication of an RA mode, and in the case of non-contention based RA, an index of a designated RA preamble sequence.

At 420, a coverage class can be determined based on radio link conditions with an eNB.

At 430, a RA preamble sequence can be selected, based at least in part on the RA resource allocation information. For contention based RA, the RA preamble sequence can be randomly selected from a set of sequences for contention based RA, and for non-contention based RA, a RA preamble indicated by the index can be selected from a set of sequences for non-contention based RA.

At 440, a payload can be generated, which can include one or more of a UE ID of a UE implementing method 400, a buffer status report, a number of repetitions (number of times the RA message will be sent), etc.

At 450, the payload can be spread via a spreading sequence, which can be selected (e.g., randomly, etc.) from a set of sequences that can be a distinct set from the set of sequences for the RA preamble.

At 460, an RA message comprising the RA preamble and payload (and optionally one or more guard bands and/or dummy bits, etc.) can be transmitted. If the payload indicates a number of repetitions and that number is greater than one, the RA message can be transmitted that number of times. In aspects, the RA message can be transmitted with a delay, which can be selected from a set of delays, and can be UE-specific.

Figure 5:
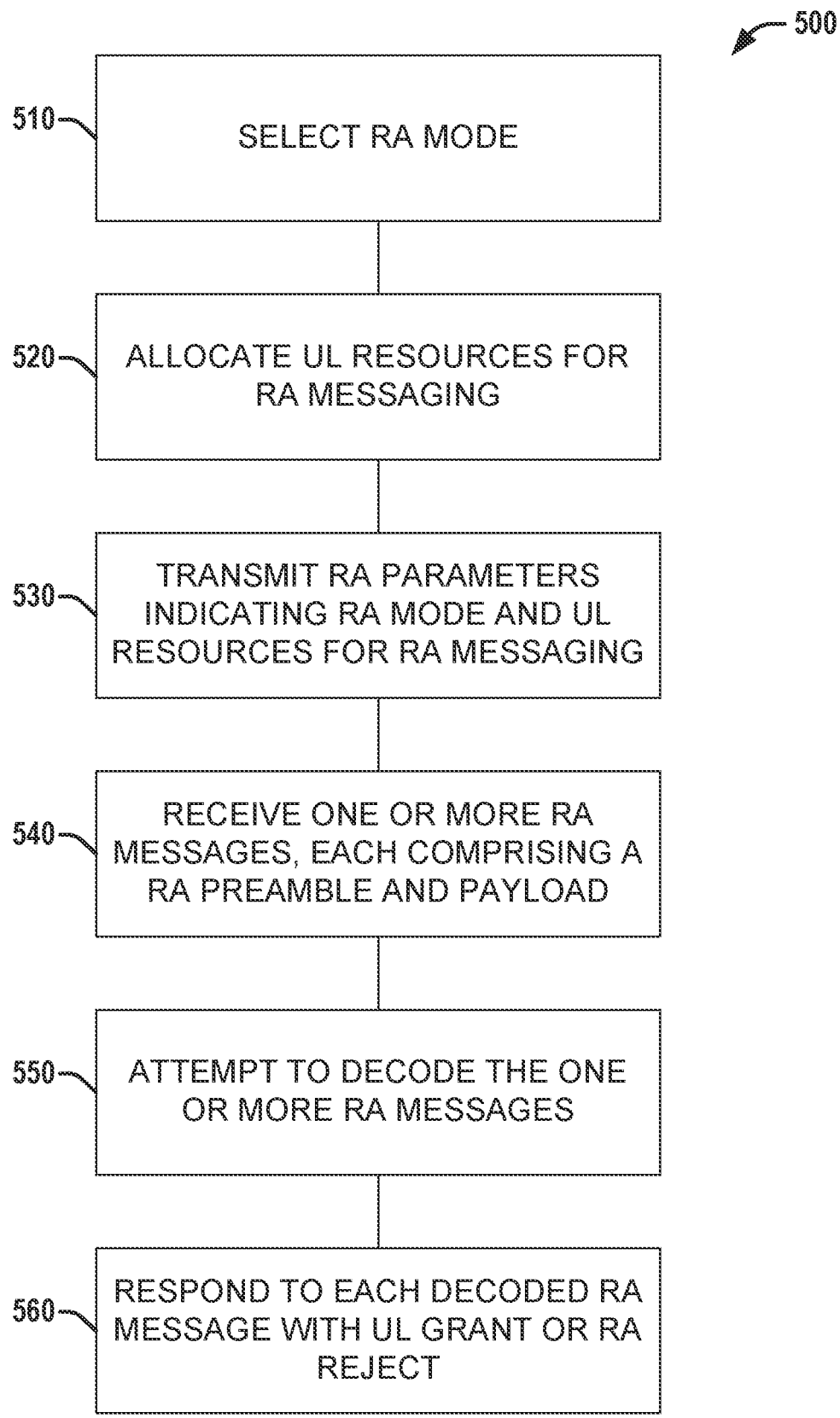
FIG. 5 is a flow diagram illustrating a method of facilitating communication via a RACH with one or more UEs in a CS-CIoT wireless system according to various aspects described herein.

Referring to FIG. 5, illustrated is a flow diagram of a method 500 of facilitating communication via a RACH with one or more UEs in a CS-CIoT wireless system according to various aspects described herein. In some aspects, method 500 can be performed at an eNB. In other aspects, a machine readable medium can store instructions associated with method 500 that, when executed, can cause an eNB to perform the acts of method 500.

At 510, a RA mode can be selected, between a contention based mode and a non-contention based mode.

At 520, a set of uplink (UL) resources can be allocated for RA messaging.

At 530, RA parameters can be transmitted that indicate the selected RA mode and, for non-contention based RA, a selected RA preamble (e.g., indicated via an associated index, etc.) for each UE for non-contention based RA.

At 540, one or more RA messages can be received, with each RA message comprising both a RA preamble and a payload (e.g., indicating one or more of UE ID, buffer status report, RA cause, number of repetitions, etc.) according to various aspects described herein.

At 550, each of the received RA messages can be attempted to be decoded. For an RA message for which multiple repetitions were sent, soft combining can be employed.

At 560, for each RA message successfully decoded, a response can be transmitted, which can include either the UE ID that originated the RA message along with a UL grant, or the UE ID along with a RA reject message.

Additional details, example embodiments, and features are provided in the following discussion.

The uplink (UL) of CS-CIoT systems contains 36 FDMA (frequency division multiple access) channels with 5 kHz bandwidth each. Out of the 5 kHz bandwidth, 3.75 kHz is allocated for data transmission, and the remaining bandwidth is used as a guard band. As there are no UL common control channels in the CS-CIoT systems, the RA message is transmitted over the UL traffic channels without any channel bonding. According to the traffic model specified in 3GPP TR 45.820, on average, 6.8 UEs access the network each second to send their packets. In the UL, when channel bonding is not used, the minimum allocation granularity is 8 slots (40 ms), which can carry a total of 150 uncoded symbols.

In the conventional RA procedure, the base station allocates the RA resources in a time division or frequency division manner for different coverage classes. Since the RA message is transmitted with the same MCS (modulation and coding scheme) and CBS (code block size) as that of the data traffic, if two UEs transmit their RA messages simultaneously, the base station may not be able to detect them, resulting in collision of the received messages.

To address these issues, various embodiments can employ techniques disclosed herein to reduce RA collision likelihood as well as device (e.g., UE) power usage.

Figure 6:
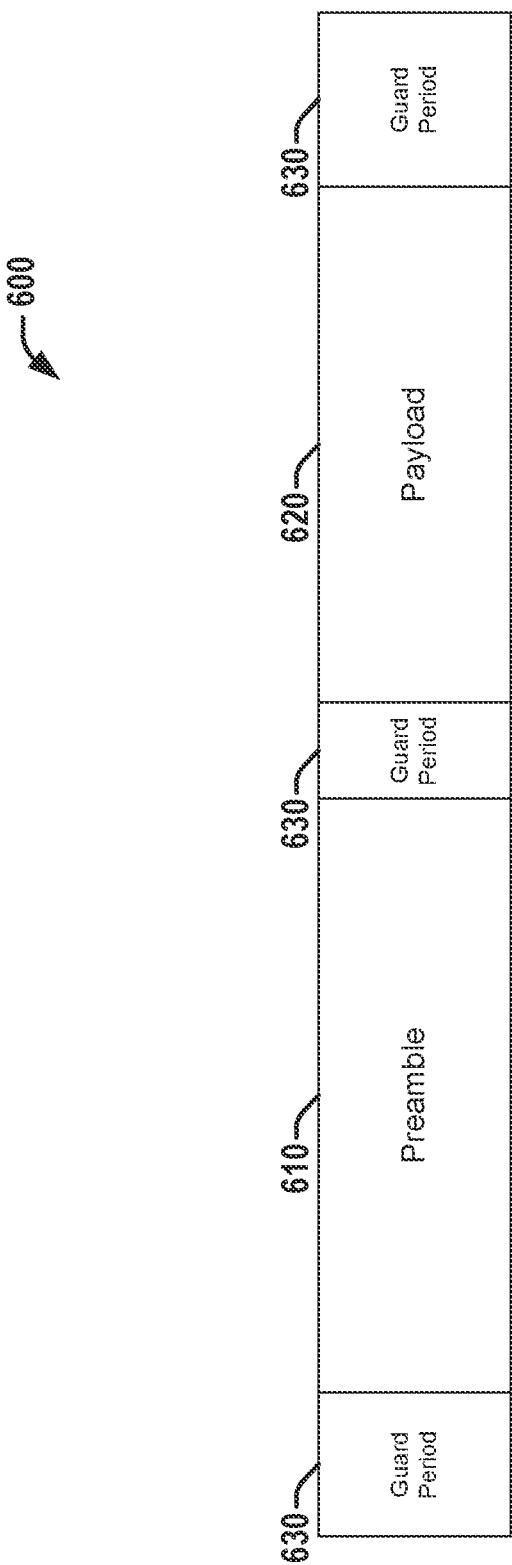
FIG. 6 is a diagram illustrating an example structure of a RA message with guard bands according to various aspects described herein.

Referring to FIG. 6, illustrated is an example structure of a RA message 600 with guard bands 630 according to various aspects described herein. As shown in FIG. 6, a RA message 600 according to various embodiments comprises a preamble sequence 610 and a payload 620. The preamble sequence 610 can be selected from a predefined set of sequences. The payload 620 can be spread by using a spreading sequence selected (e.g., randomly) from a set of spreading sequences. One predefined guard period 630 can follow the preamble sequence 610 and precede the payload 620. In addition, guard periods 630 can be included at the beginning and end of the RA message 600 (one preceding the preamble sequence 610 and one following the payload 620), which can mitigate ISI (inter-symbol interference) between adjacent slots.

Figure 7:
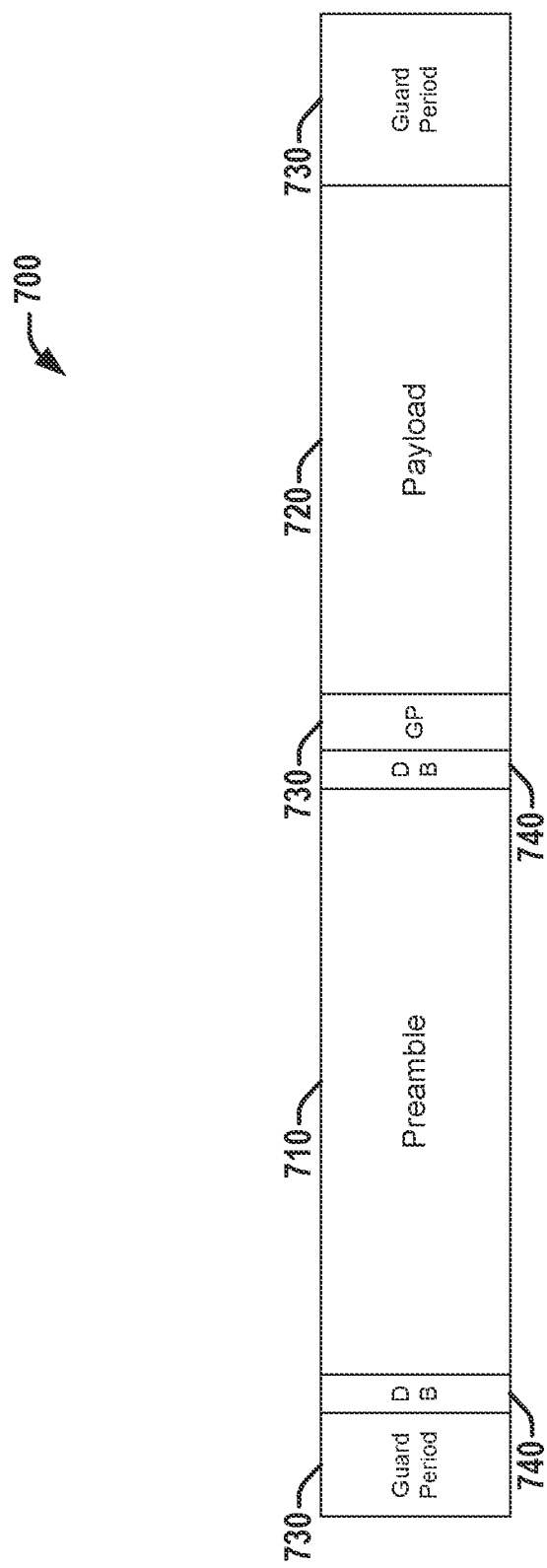
FIG. 7 is a diagram illustrating a second example structure of a RA message with guard bands and dummy bits according to various aspects described herein.

Referring to FIG. 7, illustrated is an example structure of a RA message 700 with guard bands 730 and dummy bits 740 according to various aspects described herein. The preamble sequence 710 can be padded with dummy bits 740 to further mitigate ISI. The ISI can come from the GMSK (Gaussian minimum shift keying) modulated payload in the same slot or the previous slot. In one example embodiment, 2 symbols on each end of a preamble 710 can be padded to a 16 symbol long sequence to make an example 20 symbol long sequence such as the example preamble 710. The payload 720 can be spread using a sequence selected from a set of known sequences, which can be a distinct set from the set of sequences that the preamble 710 is selected from. The set of sequences from which the preamble 710 is selected and the set of sequences from which the spreading sequence is selected can each be sets of sequences with good correlation properties, and each of the two sets can be a set of orthogonal or non-orthogonal sequences. The spreading sequence and the preamble sequence can be selected from two different sets of sequences. The guard period 730 between the preamble 710 and the payload 720 can be introduced to avoid the collision of the preamble 710 from one UE and the payload 720 from another UE. The guard periods 730 (e.g., the one between the preamble 710 and the payload 720, etc.) and dummy bits 740 are optional.

In some embodiments, the eNB (e.g., or other base station, etc.) can allocate different amounts of RA resource allocations for different coverage classes. For example, increased RA resources can be allocated for weaker coverage classes. There are two possible options for employing the increased resources, which can be employed separately or in conjunction.

In a first option, the increased RA resources for the weaker coverage classes can be employed by UEs sending repeated RA messages. The number of repetitions can be pre-determined based on the coverage class. On reception of the repeated messages, the eNB can accumulate them using IQ combining or some other soft combining technique.

In the second option, in the contiguous multiple RA resources, UEs may use longer preamble sequences and higher spreading factors to improve the RA decoding performance. In embodiments implementing this second option, different sets of sequences can be assigned to different coverage classes.

The RACH design discussed herein can reduce power consumption of CS-CIoT devices by dividing the RACH process into sub-procedures. When a UE determines a coverage class based on the downlink (DL) signal quality measurements and identifies the RA resources, two different RA processes can be implemented, based on whether contention based RA or non-contention based RA is to be employed.

For contention based RA, the UE gets the RA resource allocation information from the system information messages. The UE can select a preamble sequence randomly from a set of pre-defined sequences. A payload can be generated that can include one or more of a UE ID, buffer status report, RA cause, number of repetitions, etc. If the RA message is received successfully by the eNB, the eNB can respond with the UE ID and a UL grant in a DCI message. The UE can decode the UL grant from the eNB and can transmit the UL packet in allocated resources indicated in the UL grant. Alternatively, if the eNB receives the RA message successfully but the eNB decides not to admit the UE, the eNB can transmit the UE ID and a RA reject message.

For non-contention based RA, the UE gets the RA resource allocation information and the preamble sequence (e.g., indicated via an associated index, etc.) allocation from a DCI message. The UE can select the preamble sequence specified by the eNB, and can generate a payload that can include one or more of a UE ID, buffer status report, RA cause, number of repetitions, etc. If the RA message is received successfully by the eNB, the eNB can respond with the UE ID and a UL grant in a DCI message. The UE can decode the UL grant from the eNB and can transmit the UL packet in allocated resources indicated in the UL grant. Alternatively, if the eNB receives the RA message successfully but the eNB decides not to admit the UE, the eNB can transmit the UE ID and a RA reject message.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within a User Equipment (UE), comprising receiver circuitry, a processor, and transmitter circuitry. The receiver circuitry is configured to receive random access (RA) resource allocation information via one of a system information message or a downlink control information (DCI) message. The processor is operably coupled to the receiver circuitry and configured to: select a RA preamble sequence; generate a payload; and spread the payload via a spreading sequence. The transmitter circuitry is configured to transmit, based on the RA resource allocation information, a RA message comprising the RA preamble sequence and the payload, wherein the RA message is transmitted in a RA slot. The receiver circuitry is further configured to receive a response comprising a device identity of the UE and one of an uplink (UL) grant or a RA reject message.

Example 2 comprises the subject matter of example 1, wherein the processor is configured to select the RA preamble sequence randomly from a first set of RA preamble sequences for a contention based pseudo random access mode.

Example 3 comprises the subject matter of example 1, wherein the processor is further configured to randomly select the spreading sequence from a second set of pseudo random sequences.

Example 4 comprises the subject matter of example 1, wherein the processor is configured to select the RA preamble sequence based on the RA resource allocation information from a first set of RA preamble sequences for a non-contention based random access mode.

Example 5 comprises the subject matter of example 1, wherein the processor is further configured to select the spreading sequence from a second set of pseudo random sequences, wherein the spreading sequence is selected based on the RA resource allocation information.

Example 6 comprises the subject matter of any of examples 1-5, including or omitting optional features, wherein the payload indicates a device identity of the UE, a RA cause, and at least one of a buffer status report or an amount of data available for transmission.

Example 7 comprises the subject matter of example 6, including or omitting optional features, wherein the payload further indicates a number of repetitions, and wherein the transmitter circuitry is configured to transmit the RA message N times, wherein N is the number of repetitions.

Example 8 comprises the subject matter of example 7, including or omitting optional features, wherein the processor is further configured to: determine a coverage class based on a radio link condition; and select the number of repetitions based on the coverage class.

Example 9 comprises the subject matter of any of examples 1-5, including or omitting optional features, wherein the transmitter circuitry is configured to transmit the RA message with a delay based on a delay value selected from a set of predefined delay values.

Example 10 comprises the subject matter of any of examples 1-8, including or omitting optional features, wherein the transmitter circuitry is configured to transmit the RA message with a delay based on a delay value selected from a set of predefined delay values.

Example 11 comprises the subject matter of any of examples 1-10, including or omitting optional features, wherein the RA message comprises a plurality of guard periods.

Example 12 comprises the subject matter of example 1, wherein the payload indicates a device identity of the UE, a RA cause, and at least one of a buffer status report or an amount of data available for transmission.

Example 13 comprises the subject matter of example 1, wherein the transmitter circuitry is configured to transmit the RA message with a delay based on a delay value selected from a set of predefined delay values.

Example 14 comprises the subject matter of example 1, wherein the RA message comprises a plurality of guard periods.

Example 15 is a machine readable medium comprising instructions that, when executed, cause a User Equipment (UE) to: receive a set of random access (RA) resource allocation information that indicates a RA mode; determine a coverage class based on a set of radio link conditions; select a RA preamble sequence based at least in part on the indicated RA mode; generate a payload based at least in part on the coverage class; spread the payload via a spreading sequence selected based at least in part on the RA mode; and transmit an RA message comprising the RA preamble sequence and the payload.

Example 16 comprises the subject matter of example 15, wherein the RA message comprises a plurality of guard periods.

Example 17 comprises the subject matter of example 16, wherein a first guard period of the plurality of guard periods precedes the RA preamble sequence and a second guard period of the plurality of guard periods follows the payload.

Example 18 comprises the subject matter of example 16, wherein a third guard period of the plurality of guard periods follows the RA preamble sequence and precedes the payload.

Example 19 comprises the subject matter of any of examples 15-18, including or omitting optional features, wherein the RA preamble sequence comprises one or more initial dummy bits and one or more final dummy bits.

Example 20 comprises the subject matter of any of examples 15-18, including or omitting optional features, wherein the RA mode is contention-based RA, wherein the RA preamble sequence is selected randomly from a first set of pseudo random preamble sequences, and wherein the spreading sequence is selected randomly from a second set of pseudo random sequences.

Example 21 comprises the subject matter of example 20, including or omitting optional features, wherein the first set of pseudo random preamble sequences is distinct from the second pseudo random sequences.

Example 22 comprises the subject matter of any of examples 15-18, including or omitting optional features, wherein RA mode is non-contention-based RA, wherein the RA preamble sequence is selected based on the set of RA parameters from a first set of pseudo random preamble sequences, and wherein the RA preamble sequence is selected based on the set of RA parameters from a second set of pseudo random sequences.

Example 23 comprises the subject matter of any of examples 15-18, including or omitting optional features, wherein the instructions, when executed, further cause the UE to receive a first response to the RA message that comprises a device identity of the UE and an uplink (UL) grant or to receive a second response that comprises the device identity of the UE and a RA reject message.

Example 24 comprises the subject matter of any of examples 15-18, including or omitting optional features, wherein the RA message is transmitted in a RA slot delayed by a delay value selected from a set of predefined delay values.

Example 25 comprises the subject matter of example 24, including or omitting optional features, wherein the set of predefined delay values are defined to facilitate selection via auto-correlation.

Example 26 comprises the subject matter of example 15, wherein the RA preamble sequence comprises one or more initial dummy bits and one or more final dummy bits.

Example 27 comprises the subject matter of example 15, wherein the RA mode is contention-based RA, wherein the RA preamble sequence is selected randomly from a first set of pseudo random preamble sequences, and wherein the spreading sequence is selected randomly from a second set of pseudo random sequences.

Example 28 comprises the subject matter of example 15, wherein RA mode is non-contention-based RA, wherein the RA preamble sequence is selected based on the set of RA parameters from a first set of pseudo random preamble sequences, and wherein the RA preamble sequence is selected based on the set of RA parameters from a second set of pseudo random sequences.

Example 29 comprises the subject matter of example 15, wherein the instructions, when executed, further cause the UE to receive a first response to the RA message that comprises a device identity of the UE and an uplink (UL) grant or to receive a second response that comprises the device identity of the UE and a RA reject message.

Example 30 comprises the subject matter of example 15, wherein the RA message is transmitted in a RA slot delayed by a delay value selected from a set of predefined delay values.

Example 31 is an apparatus configured to be employed within an evolved NodeB (eNB), comprising a processor, transmitter circuitry, and receiver circuitry. The processor is configured to: select a random access (RA) mode; and allocate a set of uplink (UL) resources for RA messaging. The transmitter circuitry is configured to transmit a set of RA parameters that indicate the RA mode and the set of UL resources allocated for RA messaging. The receiver circuitry is configured to receive one or more RA requests via the set of UL resources allocated for RA messaging, wherein each of the one or more RA requests comprises a RA preamble sequence and a payload.

Example 32 comprises the subject matter of example 31, wherein the one or more RA requests comprise a first RA request received from a first UE of the plurality of UEs, and wherein a length of the payload of the first RA request and a length of the RA preamble sequence of the first RA request are based on a coverage class associated with the first UE.

Example 33 comprises the subject matter of example 31, wherein the one or more RA requests comprise a first RA request received from a first UE of the plurality of UEs, and wherein the transmitter circuitry is further configured to transmit a downlink control message comprising a device identity of the first UE and an UL grant.

Example 34 comprises the subject matter of example 31, wherein the one or more RA requests comprise a first RA request received from a first UE of the plurality of UEs, and wherein the transmitter circuitry is further configured to transmit a downlink control message comprising a device identity of the first UE and a RA reject message.

Example 35 comprises the subject matter of example 31, wherein the one or more RA requests comprise a plurality of repetitions of a first RA request received from a first UE of the plurality of UEs, and wherein the receiver circuitry is configured to accumulate the plurality of repetitions of the first RA request via soft combining.

Example 36 is an apparatus configured to be employed within a User Equipment (UE), comprising means for receiving, means for processing, and means for transmitting. The means for receiving is configured to receive random access (RA) resource allocation information via one of a system information message or a downlink control information (DCI) message. The means for processing is operably coupled to the means for receiving and configured to: select a RA preamble sequence; generate a payload; and spread the payload via a spreading sequence. The means for transmitting is configured to transmit, based on the RA resource allocation information, a RA message comprising the RA preamble sequence and the payload, wherein the RA message is transmitted in a RA slot. The means for receiving is further configured to receive a response comprising a device identity of the UE and one of an uplink (UL) grant or a RA reject message.

Example 37 is an apparatus configured to be employed within an evolved NodeB (eNB), comprising means for processing, means for transmitting, and means for receiving. The means for processing is configured to: select a random access (RA) mode; and allocate a set of uplink (UL) resources for RA messaging. The means for transmitting is configured to transmit a set of RA parameters that indicate the RA mode and the set of UL resources allocated for RA messaging. The means for receiving is configured to receive one or more RA requests via the set of UL resources allocated for RA messaging, wherein each of the one or more RA requests comprises a RA preamble sequence and a payload.

Example 38 comprises the subject matter of example 1, wherein the processor is a baseband processor.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A User Equipment (UE), comprising:
  receiver circuitry configured to receive random access (RA) resource allocation information via one of a system information message or a downlink control information (DCI) message;
  a processor operably coupled to the receiver circuitry and configured to:
    select a RA preamble sequence; and
    generate a payload including an identifier of the UE; and
  transmitter circuitry configured to transmit to a base station, based on the RA resource allocation information, the RA preamble sequence and the payload;
  wherein the receiver circuitry is further configured to receive, in response to the RA preamble sequence and the payload, a response with the identifier of the UE and including an uplink grant.

2. The UE of claim 1, wherein the identifier of the UE is a cell radio network temporary identifier (C-RNTI).

3. The UE of claim 1, wherein the processor is configured to select the RA preamble sequence randomly from a first set of RA preamble sequences for a contention based pseudo random access mode.

4. The UE of claim 1, wherein the processor is configured to select the RA preamble sequence based on the RA resource allocation information from a first set of RA preamble sequences for a non-contention based random access mode.

5. The UE of claim 1, wherein the receiving of the response is via a DCI message.

6. The UE of claim 1, wherein the receiving of the response indicates that the RA preamble sequence and the payload was successfully received by the base station.

7. The UE of claim 1, wherein the payload further indicates a a buffer status report or an amount of data available for transmission.

8. The UE of claim 1, wherein the payload further indicates a number of repetitions, and wherein the transmitter circuitry is configured to transmit the RA preamble sequence and the payload N times, wherein N is the number of repetitions.

9. The UE of claim 8, wherein the processor is further configured to:
  determine a coverage class based on a radio link condition; and
  select the number of repetitions based on the coverage class.

10. The UE of claim 1, wherein the transmitter circuitry is configured to transmit the RA preamble sequence and the payload with a delay based on a delay value selected from a set of predefined delay values.

11. A method, comprising:
  receiving random access (RA) resource allocation information via one of a system information message or a downlink control information (DCI) message;
  selecting a RA preamble sequence;
  generating a payload including an identifier of a UE;
  transmitting to a base station, based on the RA resource allocation information, the RA preamble sequence and the payload; and
  receiving a response with the identifier of the UE and including an uplink grant.

12. The method of claim 11, wherein the identifier of the UE is a cell radio network temporary identifier (C-RNTI).

13. The method of claim 11, wherein the receiving of the response with the identifier of the UE and the uplink grant indicates that the RA preamble sequence and the payload was successfully received by the base station.

14. The method of claim 11, wherein the RA preamble sequence is selected based on the RA resource allocation information from a set of RA preamble sequences for a non-contention based random access mode.

15. The method of claim 11, wherein the RA preamble sequence is selected randomly from a set of RA preamble sequences for a contention based pseudo random access mode.

16. The method of claim 11, further comprising:
  determining a coverage class based on a radio link condition; and
  selecting a number of repetitions based on the coverage class;
  wherein the payload further indicates the number of repetitions, and wherein the RA preamble sequence and the payload are transmitted N times, wherein N is the number of repetitions.

17. The method of claim 11, wherein the RA preamble sequence and the payload are transmitted with a delay based on a delay value indicated in the payload.

18. A baseband processor configured to perform operations comprising:
- receiving random access (RA) resource allocation information via one of a system information message or a downlink control information (DCI) message;
- selecting a RA preamble sequence;
- generating a payload including an identifier of a UE;
- output, for transmission to a base station, the RA preamble sequence and the payload based on the RA resource allocation information; and
- receiving, in response to the transmission the RA preamble sequence and the payload, a response indicating the identifier of the UE and an uplink resource allocation.

19. The baseband processor of claim 18, wherein the identifier of the UE is a cell radio network temporary identifier (C-RNTI).

20. The baseband processor of claim 18,
- wherein the payload further indicates a number of repetitions, and wherein the RA preamble sequence and the payload is transmitted N times, wherein N is the number of repetitions; and
- wherein the payload further indicates a delay value for transmitting the RA preamble sequence and the payload.

* * * * *